UNITED STATES PATENT OFFICE.

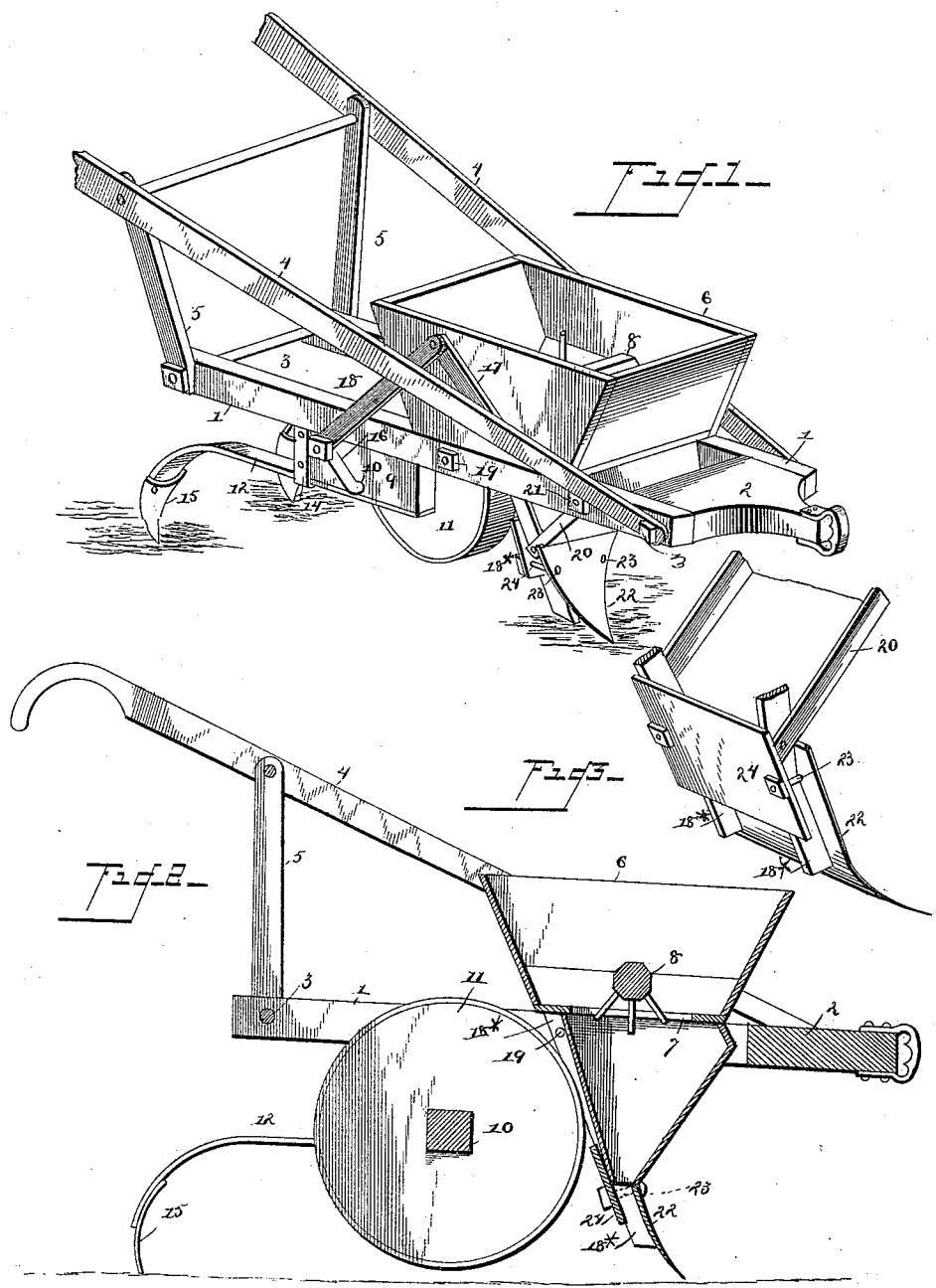

BYRON BOWERS, OF WEST BOWERSVILLE, GEORGIA.

COTTON-PLANTER.

SPECIFICATION forming part of Letters Patent No. 440,787, dated November 18, 1890.

Application filed July 7, 1890. Serial No. 357,951. (No model.)

*To all whom it may concern:*

Be it known that I, BYRON BOWERS, a citizen of the United States, residing at West Bowersville, in the county of Franklin and State of Georgia, have invented a new and useful Cotton-Planter, of which the following is a specification.

This invention has relation to cotton-planters; and the objects of the invention are to provide a cheap and simple planter, adapted to deliver seed in the very bottom of the furrow after the same has been opened and previous to the return of any dirt to the furrow, whereby the seed is planted in moist soil and germination facilitated.

A further object is to somewhat closely pack that portion of the soil immediately above, in close proximity to the seed, and leave the ridge or remaining portion of the soil above the packed portion comparatively loose, whereby water may soak into the ridge with very little obstruction. Such a process also tends to increase or facilitate the germination of the cotton-seed.

With the above objects in view the invention consists in certain features of construction, hereinafter specified, and particularly pointed out in the claim.

Referring to the drawings, Figure 1 is a perspective view of a cotton-planter constructed in accordance with my invention. Fig. 2 is a longitudinal vertical section. Fig. 3 is a perspective view of the lower end of the hopper.

Like numerals of reference indicate like parts in all the figures of the drawings.

The frame-work of the planter comprises two opposite parallel side bars 1, interposed between the front ends of which is a block 2, said side bars being bound together in proper relative position by means of tie-rods 3.

4 designates the handles, the front ends of which are connected to the frame by the tie-rods 3, and the upper ends of said handles are connected by the usual rung, and are supported and braced by a pair of vertical standards or braces 5, the upper ends of which are connected with the rung and the lower ends of which are, by the rear tie-rod 3, bound in position to the side bars 1.

6 designates the hopper, which is located near the front end of the machine and secured upon the side bars 1, said hopper being provided with a seed slot or opening 7 and having transversely journaled therein an agitator-shaft 8 provided at intervals with radiating stirring-arms. In bearing-blocks 9, secured to the under side of the side bars 1 a short distance in rear of the hopper 6, is journaled an axle 10, upon which is mounted for rotation a ground-wheel 11, the tread of which is purposely made wide.

12 designates a pair of rearwardy-disposed curved plow-standards, which standards are bolted, as under each of the blocks 9. Stirrups 14 are connected to the blocks and pass under the standards, thereby aiding the bolts 13 in a retention of the standards. The standards are each provided at their rear ends with shovels 15, occurring at each side of the wheel 11 and a slight distance in rear thereof. One end of the shaft 10, beyond one of the bearings, is cranked, as at 16, and one end of the agitator-shaft 8, beyond the hopper, is provided with a rock-arm 17, which is connected to the free end of the crank 16 by means of a connecting-rod 18. The crank 16 is shorter than the rock-arm 17, so that although the crank revolves with the wheel and its axle such revolution merely imparts to the crank 17 and the agitator-shaft 8 a partial revolution—a rocking or oscillatory movement.

18* designates a pair of depending forwardly-disposed standards, bolted, as at 19, to the side bars 1 immediately below the hopper. These standards are braced by oppositely-inclined standards 20, bolted, as at 21, to the side bars 1, rearwardly disposed and secured at their lower ends to the standards 18* at a point above the lower ends of said standards, and the space surrounded by the standards is walled in, as shown, so that below the bottom of the hopper a secondary hopper or discharge-spout is formed.

22 designates the furrow or cotton-bed opening plow or shovel, which is applied to the front edges of the standards 18*, and beyond the opposite side of the standard the shovel has passed therethrough binding-bolts 23, which bolts are disposed to the rear and pass through openings formed in a clip-plate 24.

In this manner a continuation of the secondary hopper or discharge-spout is formed, and said discharge-pipe, it will be observed, is directly in rear of the plow.

The operation of the invention is as follows: The cotton-seed is fed in the usual way from the hopper 6 down into the discharge-spout, and the seed fall directly into the bottom of the furrow in rear of the furrow-opener shovel, and follow said shovel so closely, by reason of their close relation and location, that the soil does not have time to fall back into the harrow, as has heretofore been the case. This is extremely advantageous, for the reason that the seed fall directly upon the moist bottom of the furrow instead of, as heretofore, upon the half-filled furrow and the dry soil contained therein. Of course after the seed have dropped into the bottom of the furrow said furrow is partially filled and the seed lightly covered by that portion of the soil removed from the furrow that returns or rolls back into the furrow after the passage of the plow. As the machine moves on, the packing roller or wheel 11 travels over so much of the loose dirt as has returned to the furrow, and thus the same is packed somewhat snugly upon the newly-planted seed. The soil thus packed by the wheel is sufficient in quantity to insure germination, and that, too, in a comparatively short time, and therefore a final packing of the dirt turned in by the following or furrow-closing shovels is not necessary; but, on the contrary, it is desirable that the same should be loose, so that water may freely percolate through the loose dirt to the compact dirt around the seed.

The length of the machine is comparatively small, for the reason that the parts are located in such close proximity to one another, and thus I am enabled to turn the machine in very small spaces, and therefore run the furrows or hills close to hedges or fences.

Having described my invention, what I claim is—

In a corn or cotton planter, the combination, with the opposite side bars 1, the hopper, and agitating devices, of the forwardly and downwardly inclined bars 18*, the rearwardly and downwardly inclined braces 20, bolted at their lower ends to the bars 18*, the secondary hopper secured within the frame thus formed and having communication with the upper hopper, the shovel 22, located in front of the lower ends of the bars 18*, the plate 24, located at the rear of said lower ends of said bars 18* and combining with the shovel to form a discharge-spout for the secondary hopper, and the bolts 23, for connecting the shovel and plates, substantially as specified.

In testimony that I claim the foregoing as my own I have hereto affixed my signature in presence of two witnesses.

BYRON BOWERS.

Witnesses:
MITCHELL J. WEBB,
M. M. RICHARDSON.